(12) United States Patent
Nishiguchi

(10) Patent No.: US 12,513,261 B2
(45) Date of Patent: Dec. 30, 2025

(54) VIDEO MANAGEMENT SYSTEM

(71) Applicant: JVCKENWOOD Corporation, Yokohama (JP)

(72) Inventor: Koki Nishiguchi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/945,593

(22) Filed: Nov. 13, 2024

(65) Prior Publication Data

US 2025/0071234 A1   Feb. 27, 2025

Related U.S. Application Data

(63) Continuation of application No. PCT/JP2023/014192, filed on Apr. 6, 2023.

(30) Foreign Application Priority Data

Jun. 6, 2022   (JP) .................. 2022-091626

(51) Int. Cl.
*G11B 25/00* (2006.01)
*G11B 27/00* (2006.01)
*H04N 5/77* (2006.01)

(52) U.S. Cl.
CPC ............. *H04N 5/77* (2013.01); *G11B 27/005* (2013.01)

(58) Field of Classification Search
CPC ....... G11B 25/00; G11B 27/00; G11B 27/005; H04N 5/77
USPC ................ 386/358, 362, 326, 278, 239, 248
See application file for complete search history.

(56) References Cited

U.S. PATENT DOCUMENTS

| 2020/0372257 | A1* | 11/2020 | Funaki | ................. G06V 10/95 |
| 2020/0404187 | A1* | 12/2020 | Iida | ...................... H04N 23/698 |
| 2021/0067733 | A1* | 3/2021 | Kuo | ....................... H04N 23/90 |
| 2021/0319224 | A1 | 10/2021 | Sakai et al. | |

FOREIGN PATENT DOCUMENTS

JP   2020-141170   9/2020

OTHER PUBLICATIONS

International Search Report and Written Opinion for International Application Serial No. PCT/JP2023/014192 mailed Jun. 13, 2023, 9 pages.

* cited by examiner

*Primary Examiner* — Daquan Zhao
(74) *Attorney, Agent, or Firm* — Amin, Turocy & Watson, LLP

(57) ABSTRACT

A video management system is configured to include plural terminal devices, a drive recorder to be mounted in a vehicle, and a management apparatus. The management apparatus stores the set of corresponding data generated by a generation unit, determines, upon receipt of a replay request including a piece of identification information, whether or not a piece of identification information associated with a set of video data that is a target of the replay request agrees with the piece of identification information included in the replay request, and permits a transmission source of the replay request to replay the set of video data in a case where it has been determined that these pieces of identification information agree with each other.

8 Claims, 10 Drawing Sheets

VIDEO MANAGEMENT SYSTEM

CROSS-REFERENCE TO RELATED APPLICATIONS

This application is a Continuation of PCT International Application No. PCT/JP2023/014192 filed on Apr. 6, 2023 which claims the benefit of priority from Japanese Patent Applications No. 2022-091626 filed on Jun. 6, 2022, the entire contents of both of which are incorporated herein by reference.

FIELD

The present disclosure relates to video management systems.

BACKGROUND

A known drive recorder in a vehicle captures videos of the inside and the outside of the vehicle. A drive recorder that enables a captured video to be replayed has been disclosed in Patent Literature 1.
Patent Literature 1: Japanese Unexamined Patent Application Publication No. 2020-141170

SUMMARY

Technical Problem

A drive recorder like the one described in Patent Literature 1 transmits a video to a preregistered terminal device, such as a smartphone, to enable the video to be replayed on a display unit of the terminal device. In this case, for example, any user who has the preregistered terminal device is able to replay the video even if the user is not on board the vehicle. In some cases, the drive recorder captures videos of the inside of the vehicle and privacy issues involved in these cases are thus sought to be addressed.

Solution to Problem

A video management system configured to include plural terminal devices, a drive recorder to be mounted in a vehicle, and a management apparatus, wherein the plural terminal devices each include a terminal communication unit that is capable of performing communication with the drive recorder and transmitting a radio signal including a specific piece of identification information, the drive recorder comprises: an image capturing unit that generates a set of video data by capturing a video of at least one of inside and outside of the vehicle; a recorder communication unit that is capable of performing communication with the terminal devices and the management apparatus; an extraction unit that extracts a piece of identification information on any terminal device that is in the vehicle in a case where the radio signals including the pieces of identification information have been received from the plural terminal devices; and a generation unit that generates a set of corresponding data having the extracted piece of identification information associated with the set of video data generated, and the management apparatus comprises: a management communication unit that is capable of performing communication with the drive recorder and the terminal devices; a storage unit that stores the set of corresponding data generated by the generation unit; and a replay processing unit that determines, upon receipt of a replay request including the piece of identification information, whether or not the piece of identification information associated with the set of video data that is a target of the replay request agrees with the piece of identification information included in the replay request, and that permits a transmission source of the replay request to replay the set of video data in a case where it has been determined that these pieces of identification information agree with each other.

A video management system configured to include plural terminal devices and a drive recorder that is to be mounted in a vehicle, wherein the plural terminal devices each include a terminal communication unit that is capable of performing communication with the drive recorder and capable of transmitting a radio signal including a specific piece of identification information, and the drive recorder comprises: an image capturing unit that generates a set of video data by capturing a video of at least one of inside and outside of the vehicle; a recorder communication unit that is capable of performing communication with the terminal devices; an extraction unit that extracts a piece identification information of any terminal device that is in the vehicle in a case where the radio signals including the pieces of identification information have been received from the plural terminal devices; a generation unit that generates a set of corresponding data having the extracted piece of identification information associated with the set of video data generated; a storage unit that stores the set of corresponding data generated by the generation unit; and a replay processing unit that determines, upon receipt of a replay request including the piece of identification information, whether or not the piece of identification information associated with the set of video data that is a target of the replay request agrees with the piece of identification information included in the replay request, and permits a transmission source of the replay request to replay the set of video data in a case where it has been determined that these pieces of identification information agree with each other.

DESCRIPTION OF EMBODIMENTS

An embodiment of a video management system according to the present disclosure will hereinafter be described on the basis of the drawings. The invention is not to be limited by this embodiment. Components in the following embodiment include those easily substitutable by persons skilled in the art or those that are substantially the same.

Figure 1:
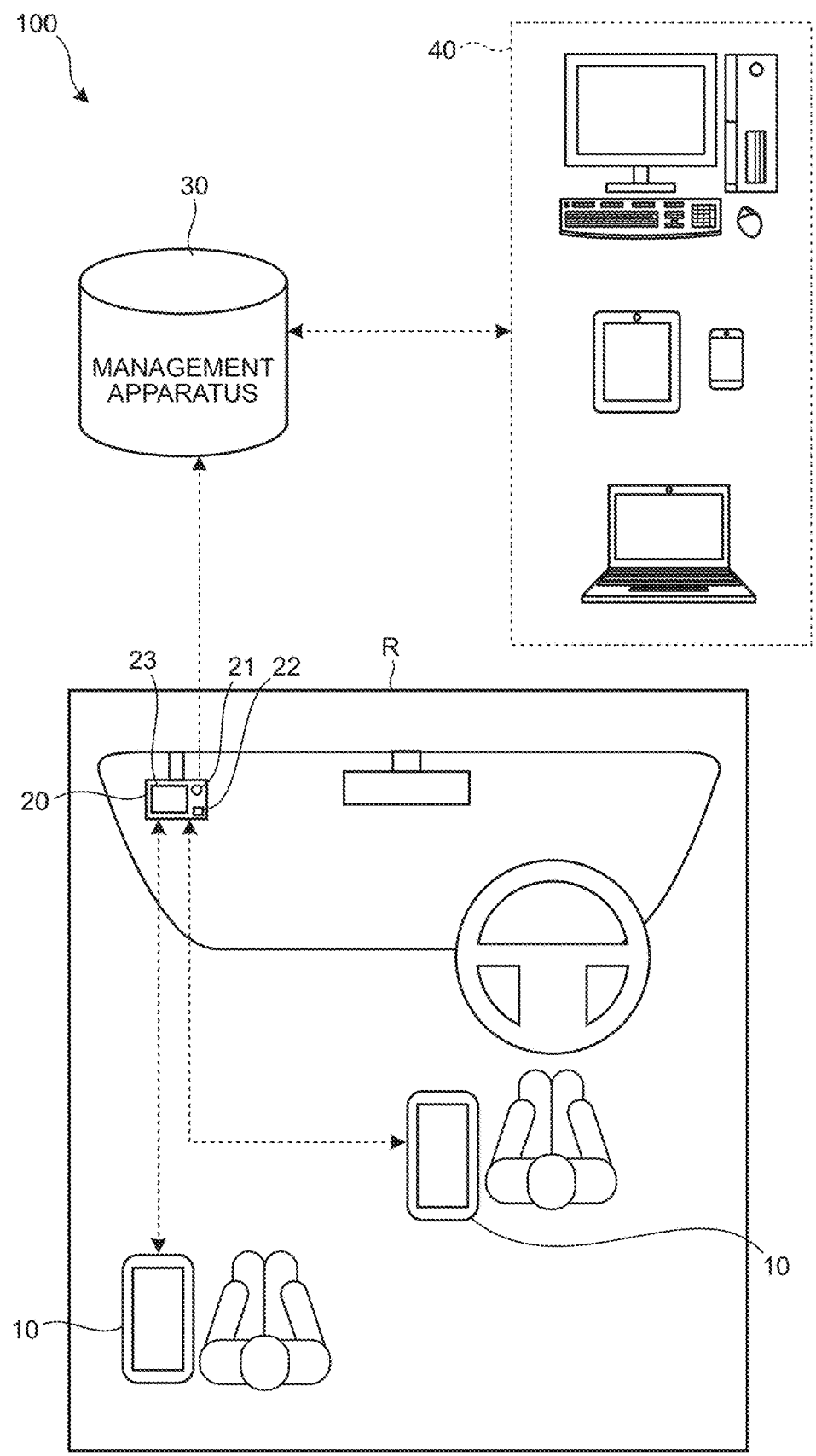
FIG. 1 is a schematic diagram illustrating an example of a video management system according to an embodiment.
Figure 2:
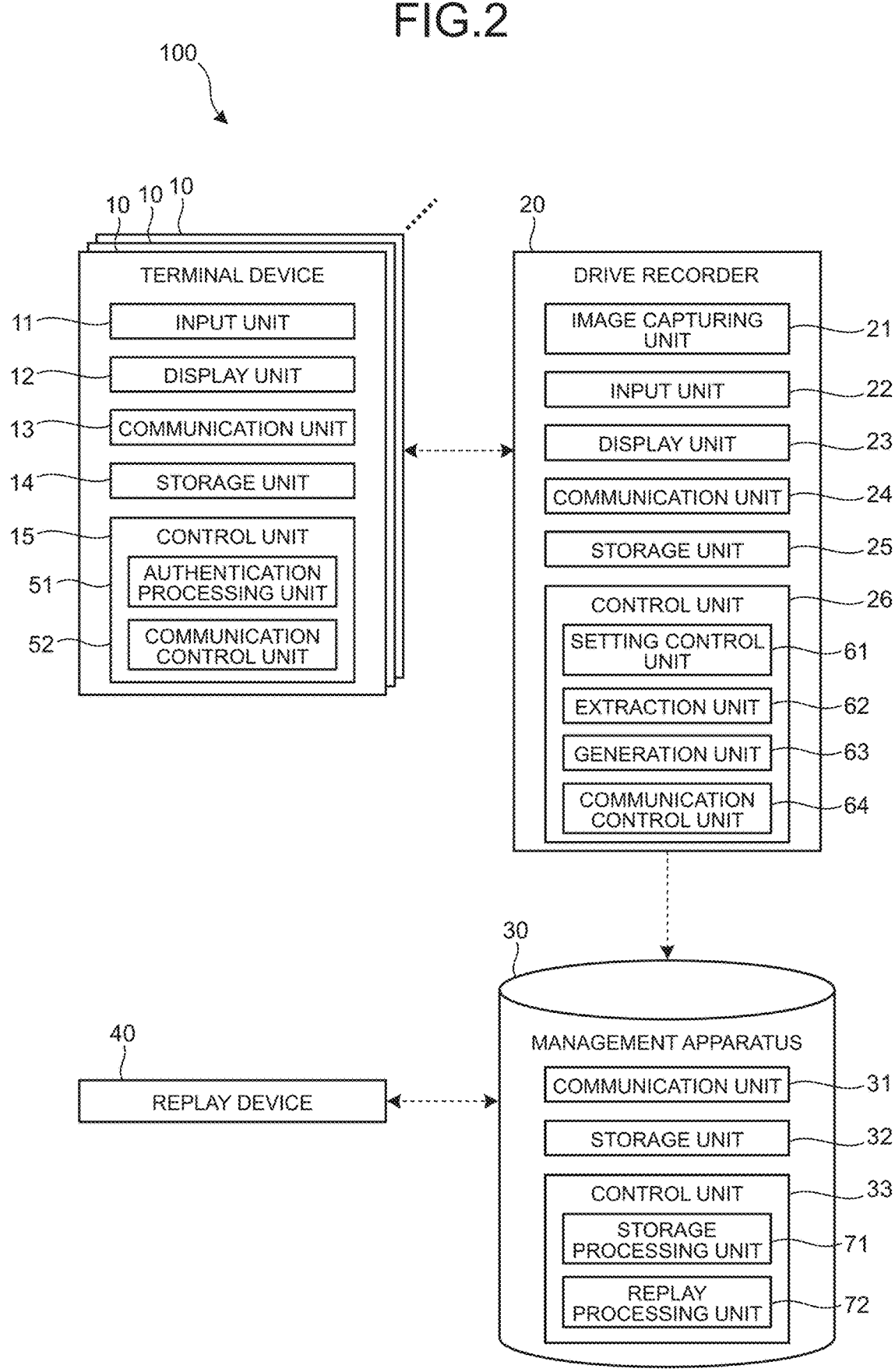
FIG. 2 is a functional block diagram illustrating an example of the video management system according to the embodiment.

FIG. 1 is a schematic diagram illustrating an example of a video management system 100 according to the embodiment. FIG. 2 is a functional block diagram illustrating the example of the video management system 100 according to the embodiment. As illustrated in FIG. 1 and FIG. 2, the video management system 100 includes terminal devices 10, a drive recorder 20, and a management apparatus 30.

The terminal devices 10 are each capable of transmitting a specific piece of identification information by means of a radio signal. The terminal devices 10 are each a terminal that is able to be carried and used by a user who boards a vehicle. Examples of the terminal devices 10 includes, for example, portable information communication terminals, such as smartphones and tablets.

The terminal devices 10 each have an input unit 11, a display unit 12, a communication unit (terminal communication unit) 13, a storage unit 14, and a control unit 15.

The input unit 11 enables predetermined input operation for inputting information. The input unit 11 outputs an instruction signal to the control unit 15, according to the input operation. For example, an input device, such as a keyboard or a touch panel, is used as the input unit 11. In addition to or instead of the input device, a button, a lever, a dial, a switch, or any other input device may be used as the input unit 11. The input unit 11 outputs the instruction signal corresponding to the predetermined input operation.

The display unit 12 is, for example, a display panel, such as a liquid crystal panel, and displays various kinds of information including text and images.

The communication unit 13 performs communication of information to and from the drive recorder 20 and the management apparatus 30. The communication unit 13 is capable of performing wireless communication with the drive recorder 20 by means of, for example, a short-range radio signal.

The storage unit 14 stores various kinds of information. The storage unit 14 has, for example, a storage, such as a hard disk drive or a solid state drive. An external storage medium, such as a removable disk, may be used as the storage unit 14. The storage unit 14 stores, for example, an operating system of the terminal device 10, and various applications, programs, and data for controlling operation of the input unit 11, the display unit 12, and the communication unit 13. The storage unit 14 stores an application for setting the piece of identification information for the drive recorder 20.

The control unit 15 controls each of the input unit 11, the display unit 12, the communication unit 13, and the storage unit 14. The control unit 15 has a processing device, such as a central processing unit (CPU) and a storage device, such as a random access memory (RAM) or a read only memory (ROM). The control unit 15 has, as illustrated in FIG. 2, an authentication processing unit 51 and a communication control unit 52.

The authentication processing unit 51 performs authentication operation, such as pairing with the drive recorder 20. The authentication operation includes operation for obtaining a piece of authentication information described later, from the drive recorder 20. The authentication processing unit 51 causes the storage unit 14 to store the piece of authentication information obtained.

The communication control unit 52 causes the communication unit 13 to transmit and receive information. The communication control unit 52 causes the piece of authentication information to be transmitted as the piece of identification information on the terminal device 10, from the communication unit 13, the piece of authentication information having been stored in the storage unit 14. The communication control unit 52 may cause the piece of authentication information to be transmitted from the communication unit 13 by means of a short-range radio signal, by, for example, a transmission method, such as broadcast transmission.

The terminal device 10 is able to be used as a replay device 40 described later. In a case where the terminal device 10 is used as the replay device 40, the terminal device 10 has a configuration for making a replay request (described later) to the management apparatus 30.

The drive recorder 20 is mounted in the vehicle. The drive recorder 20 has an image capturing unit 21, an input unit 22, a display unit 23, a communication unit (recorder communication unit) 24, a storage unit 25, and a control unit 26.

The image capturing unit 21 captures videos of the inside and outside of the vehicle and thereby generates sets of video data. For example, the image capturing unit 21 may be set to generate a set of video data every time a predetermined time period elapses. The image capturing unit 21 causes the storage unit 25 to store the sets of video data generated.

The input unit 22 enables predetermined input operation for inputting information. The input unit 22 outputs an instruction signal to the control unit 26, according to the input operation. For example, an input device, such as a keyboard or a touch panel, is used as the input unit 22. In addition to or instead of the input device, a button, a lever, a dial, a switch, or any other input device may be used as the input unit 22. The input unit 22 outputs the instruction signal corresponding to the predetermined input operation.

The display unit 23 causes information, such as images and text, to be displayed. For example, a liquid crystal panel is used as the display unit 23.

The communication unit 24 performs wireless communication with the terminal devices 10 and the management apparatus 30. The communication unit 24 is capable of performing wireless communication with the terminal devices 10, by means of, for example, short-range radio signals. The communication unit 24 is capable of detecting intensities of the short-range radio signals. In a case where the communication unit 24 has detected an intensity of a short-range radio signal, the communication unit 24 outputs the intensity detected, to the control unit 26.

The storage unit 25 stores various kinds of information. The storage unit 25 has, for example, a storage, such as a hard disk drive or a solid state drive. An external storage medium, such as a removable disk, may be used as the storage unit 25. The storage unit 25 stores, for example, an operating system of the drive recorder 20, and various applications, programs, and data for controlling operation of the image capturing unit 21 and the communication unit 24. The storage unit 25 stores the sets of video data generated by the image capturing unit 21. The storage unit 25 stores the pieces of identification information included in the radio signals received by the communication unit 24.

The control unit 26 controls each of the image capturing unit 21, the communication unit 24, and the storage unit 25. The control unit 26 has a processing device, such as a CPU, and a storage device, such as a RAM or ROM. The control unit 26 has a setting control unit 61, an extraction unit 62, a generation unit 63, and a communication control unit 64.

The setting control unit 61 performs setting of the pieces of identification information for the terminal devices 10. The setting control unit 61 may set pieces of authentication information for individual terminal devices 10 as the pieces of identification information. The setting control unit 61 controls authentication operation for the terminal devices 10. The setting control unit 61 may cause, for example, the display unit 23 to display a password, in the authentication operation.

The extraction unit 62 obtains the pieces of identification information from the short-range radio signals received by the communication unit 24. The extraction unit 62 extracts a piece of identification information from any terminal device 10 that is present in the vehicle, from the pieces of identification information obtained. In a case where the communication unit 24 receives a short-range radio signal from a terminal device 10 positioned outside the vehicle, reception intensity is lower than that in a case where a short-range radio signal is received from a terminal device 10 that is inside the vehicle. Therefore, on the basis of intensities of the short-range radio signals received, the extraction unit 62 is able to extract the piece of identification information on the terminal device 10 that is in the vehicle. For example, in a case where the intensity of a short-range radio signal received is equal to or higher than a predetermined threshold, the extraction unit 62 extracts the piece of identification information included in the short-range radio signal as a piece of identification information from a terminal device 10 that is in the vehicle. In a case where the intensity of a short-range radio signal received is lower than the predetermined threshold, the extraction unit 62 refrains from extracting the piece of identification information included in the short-range radio signal.

The generation unit 63 generates a set of corresponding data having a set of video data associated with a piece of identification information extracted by the extraction unit 62, the set of video data having been generated by the image capturing unit 21. The generation unit 63 generates a set of corresponding data for each set of video data.

The communication control unit 64 causes the set of corresponding data to be transmitted from the communication unit 24 to the management apparatus 30, the set of corresponding data having been generated by the generation unit 63.

The management apparatus 30 manages the set of corresponding data generated by the generation unit 63. The management apparatus 30 performs, as management of the set of corresponding data, for example, a determination of whether or not replay is to be permitted in response to a replay request from the replay device 40. The replay request is information indicating that a replay of a set of video data included in the set of corresponding data is requested. The above described terminal device 10 may be used, for example, as the replay device 40, but the replay device 40 is not necessarily the terminal device 10 and may be any other device capable of performing communication with the management apparatus 30 and capable of replaying video data. The management apparatus 30 has a communication unit (management communication unit) 31, a storage unit 32, and a control unit 33.

The communication unit 31 performs wireless communication with the drive recorder 20 and the replay device 40. The communication unit 31 receives a set of corresponding data included in a radio signal transmitted from the drive recorder 20. The communication unit 31 receives a replay request transmitted from the replay device 40.

The storage unit 32 stores various kinds of information. The storage unit 32 has, for example, a storage, such as a hard disk drive or a solid state drive. An external storage medium, such as a removable disk, may be used as the storage unit 32. The storage unit 32 stores, for example, an operating system of the management apparatus 30, and various applications, programs, and data for controlling operation of the communication unit 31 and operation at the control unit 33. The storage unit 32 stores a set of corresponding data included in a radio signal received by the communication unit 31.

The control unit 33 controls each of the communication unit 31 and the storage unit 32. The control unit 33 has a processing device, such as a CPU, and a storage device, such as a RAM or a ROM. The control unit 33 has a storage processing unit 71 and a replay processing unit 72.

The storage processing unit 71 causes the storage unit 32 to store sets of corresponding data received by the communication unit 31.

In a case where a replay request for a set of video data has been received by the communication unit 31 with respect to a set of corresponding data stored in the storage unit 32, the replay processing unit 72 determines whether or not the piece of identification information associated with the set of video data, for which the replay request has been received, is included in the replay request. In a case where the replay processing unit 72 has determined that the piece of identification information associated with the set of video data, for which the replay request has been received, is included in the replay request, the replay processing unit 72 permits replay of the set of video data. In this case, the replay processing unit 72 causes permission information to be transmitted as a request result from the communication unit 31 to the replay device 40, the permission information indicating that the replay has been permitted. In a case where the replay processing unit 72 has determined that the piece of identification information associated with the set of video data, for which the replay request has been received, is not included in the replay request, the replay processing unit 72 does not permit the replay of the set of video data. In this case, the replay processing unit 72 causes non-permission information to be transmitted as a request result from the communication unit 31 to the replay device 40, the non-permission information indicating that the replay is not permitted.

A flow of operation of the video management system 100 configured as described above will be described next. FIG. 3 to FIG. 6 are diagrams each illustrating an example of operation of the video management system 100.

Figure 3:
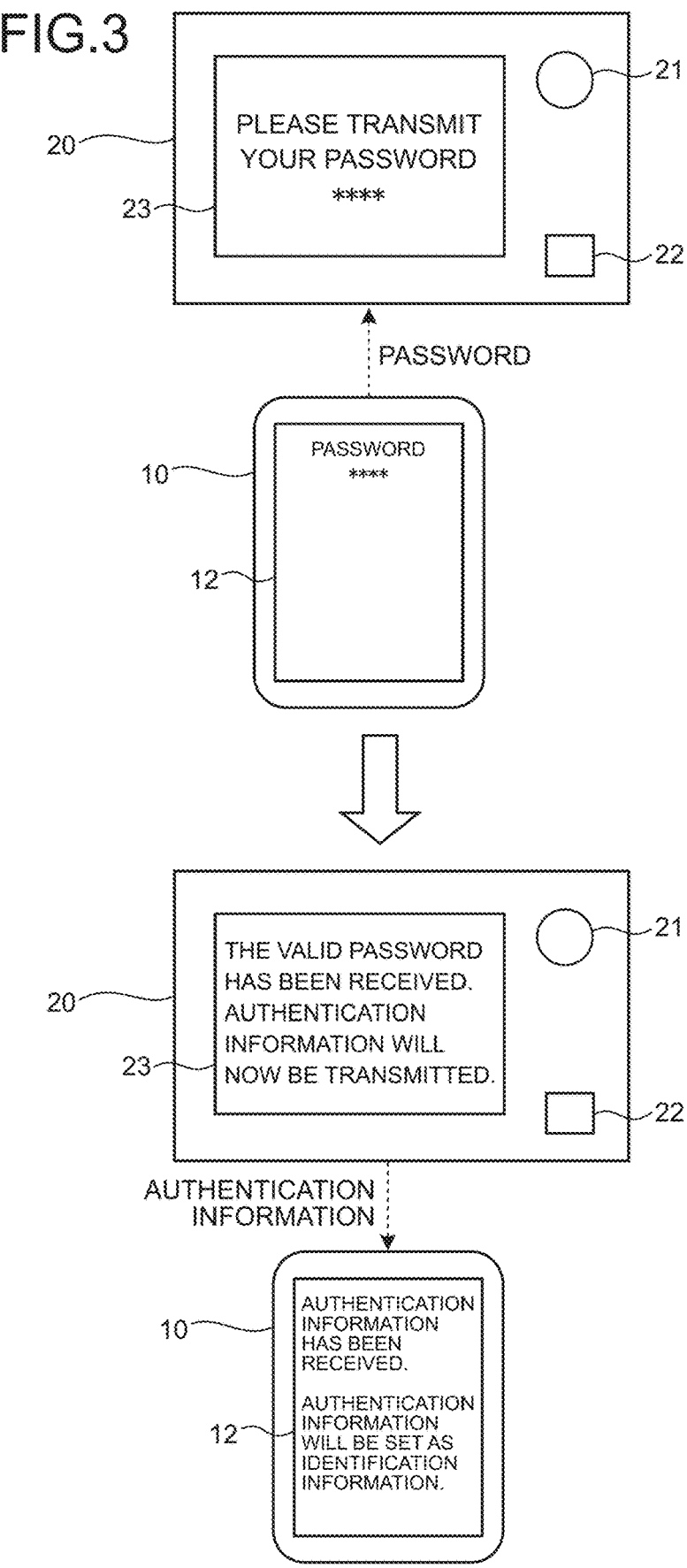
FIG. 3 is a diagram illustrating an example of operation of the video management system.
Figure 4:
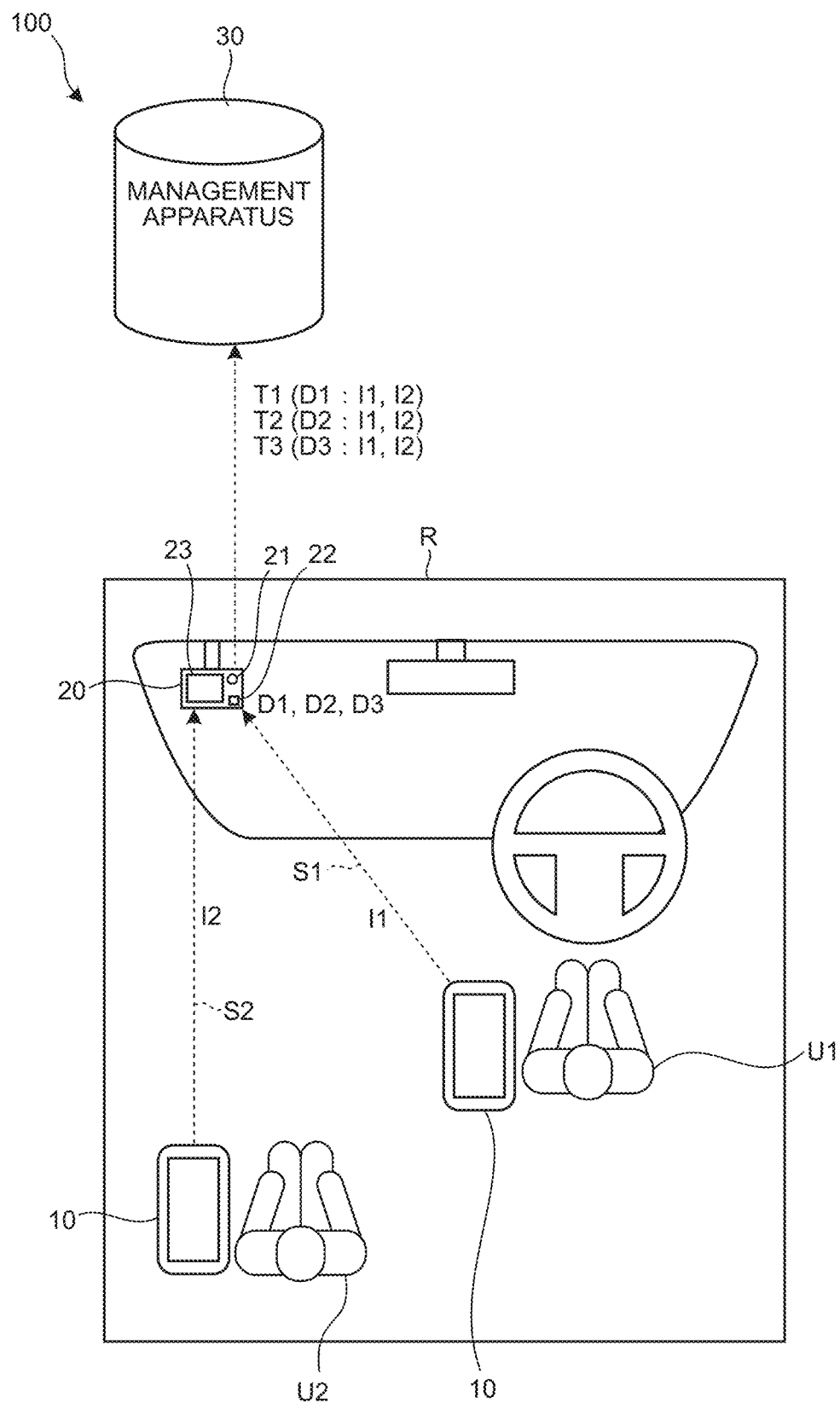
FIG. 4 is a diagram illustrating an example of operation of the video management system.

Operation in a case where a piece of authentication information is set between the terminal device 10 and the drive recorder 20 will be described first. As illustrated in FIG. 3, in a case where predetermined operation for setting a piece of authentication information has been performed on the input unit 22 of the drive recorder 20, the setting control unit 61 causes a password to be displayed on the display unit 23 for a predetermined time period. In a case where the password has been input by the input unit 11 of the terminal device 10, the authentication processing unit 51 causes the password to be transmitted to the drive recorder 20.

In a case where the password transmitted from the terminal device 10 has been received at the drive recorder 20, the setting control unit 61 determines whether or not the password is valid. In a case where the setting control unit 61 has determined that the password is valid, the setting control unit 61 causes the piece of authentication information to be transmitted to the terminal device 10.

In a case where the piece of authentication information transmitted from the drive recorder 20 has been received at the terminal device 10, the authentication processing unit 51 stores the piece of authentication information received, into the storage unit 14. The authentication processing unit 51 sets the piece of authentication information stored in the storage unit 14 as a piece of identification information. A method of performing authentication between the terminal device 10 and the drive recorder 20 is not limited to the above described method and any other method may be adopted.

Operation in a case where sets of corresponding data are generated at the drive recorder 20 will be described next. In a case described first, users U1 and U2 having terminal devices 10 set with pieces of identification information I1 and I2 have boarded a vehicle R mounted with the drive recorder 20.

The image capturing unit 21 in the drive recorder 20 captures videos of at least one of the inside and the outside of the vehicle R and generates a set of video data every time a predetermined time period elapses. The image capturing unit 21 generates the sets of video data correspondingly to time. The image capturing unit 21 causes the storage unit 25 to store the sets of video data generated. In the example illustrated in FIG. 4, the image capturing unit 21 generates sets of video data D1, D2, and D3.

Communication control units 52 in the terminal devices 10 that the users U1 and U2 have cause short-range radio signals S1 and S2 to be transmitted to the drive recorder 20 by broadcast transmission, the short-range radio signals S1 and S2 including the pieces of identification information I1 and I2. The communication control units 52 cause the short-range radio signals to be transmitted per, for example, a time period shorter than the predetermined time period, over which each set of video data is generated, the short-range radio signals including the pieces of identification information I1 and I2.

The communication unit 24 in the drive recorder 20 receives the short-range radio signals S1 and S2 transmitted from the terminal devices 10 and detects intensities of the short-range radio signals S1 and S2. The communication unit 24 outputs the received short-range radio signals S1 and S2 and the detected intensities to the control unit 26. On the basis of the short-range radio signals S1 and S2 received, the extraction unit 62 obtains the pieces of identification information I1 and I2.

The extraction unit 62 extracts a piece of identification information from any terminal device 10 that is present in the vehicle R, from the pieces of identification information I1 and I2 obtained. In this case, in a case where the intensities of the short-range radio signals S1 and S2 received at the communication unit 24 are equal to or higher than the predetermined threshold, the extraction unit 62 extracts the pieces of identification information included in the short-range radio signals S1 and S2 as the pieces of identification information from the terminal devices 10 that are present in the vehicle R. On the contrary, in a case where the intensities of the short-range radio signals S1 and S2 received at the communication unit 24 are less than the predetermined threshold, the extraction unit 62 refrains from extracting the pieces of identification information included in the short-range radio signals S1 and S2. In the example illustrated in FIG. 4, the intensities of the short-range radio signals S1 and S2 are equal to or higher than the predetermined threshold, and the extraction unit 62 thus extracts the pieces of identification information I1 and I2 included in the short-range radio signals S1 and S2 as the pieces of identification information from the terminal devices 10 that are present in the vehicle R.

The generation unit 63 generates sets of corresponding data T1, T2, and T3 having the sets of video data D1, D2, and D3 associated with the pieces of identification information I1 and I2 extracted by the extraction unit 62, the sets of video data D1, D2, and D3 having been generated by the image capturing unit 21. The generation unit 63 generates a set of corresponding data for each of the sets of video data D1, D2, and D3. The generation unit 63 generates the sets of corresponding data by, for example, associating the pieces of identification information I1 and I2 extracted in a generation time period from a start to a completion of generation of each of the sets of video data D1, D2, and D3, with the sets of video data D1, D2, and D3. The sets of corresponding data T1, T2, and T2 having the pieces of identification information I1 and I2 associated with the sets of video data D1, D2, and D3 are thereby generated, the pieces of identification information I1 and I2 being on the users U1 and U2 on board the vehicle R in the generation time periods of the sets of video data D1, D2, and D3.

Figure 5:
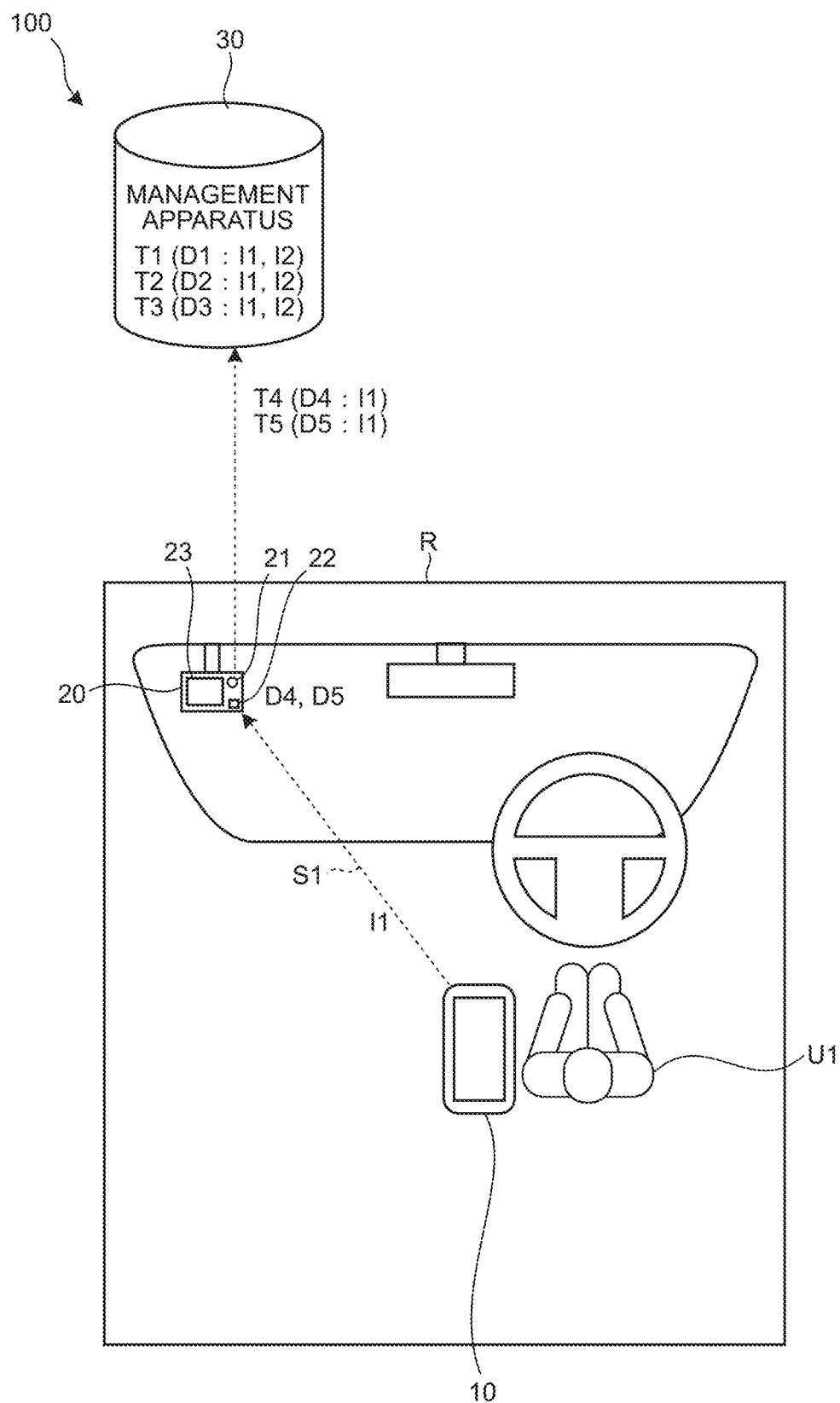
FIG. 5 is a diagram illustrating an example of operation of the video management system.

In a case described now, for example, one U2 of the two users U1 and U2 gets out of the vehicle R after the set of video data D3 has been generated, and sets of video data D4 and D5 are generated by the image capturing unit 21 after the user U2 has gotten out of the vehicle R. In this case, as illustrated in FIG. 5, a short-range radio signal S1 including the piece of identification information I1 is transmitted from the terminal device 10 that the user U1 has. The communication unit 24 in the drive recorder 20 receives the short-range radio signal S1 transmitted from the terminal device 10. The extraction unit 62 obtains the piece of identification information I1 on the basis of the short-range radio signal S1 received and extracts, as a piece of identification information from a terminal device 10 that is present in the vehicle R, the piece of identification information I1 obtained. The generation unit 63 generates sets of corresponding data T4 and T5 having this piece of identification I1 associated with the sets of video data D4 and D5. The sets of corresponding data T4 and T5 having the piece of identification information I1 associated with the sets of video data D4 and D5 are thereby generated, the piece of identification information I1 being on the user U1 who is on board the vehicle M in generation time periods of the sets of video data D4 and D5.

The communication control unit 64 transmits the sets of corresponding data T1 to T5 generated by the generation unit 63, to the management apparatus 30.

The communication unit 31 in the management apparatus 30 receives the sets of corresponding data T1 to T5 transmitted. The storage processing unit 71 causes the sets of corresponding data T1 to T5 to be stored in the storage unit 32, the sets of corresponding data T1 to T5 having been received by the communication unit 31. The sets of corresponding data T1 to T5 are stored in the storage unit 32.

Figure 6:
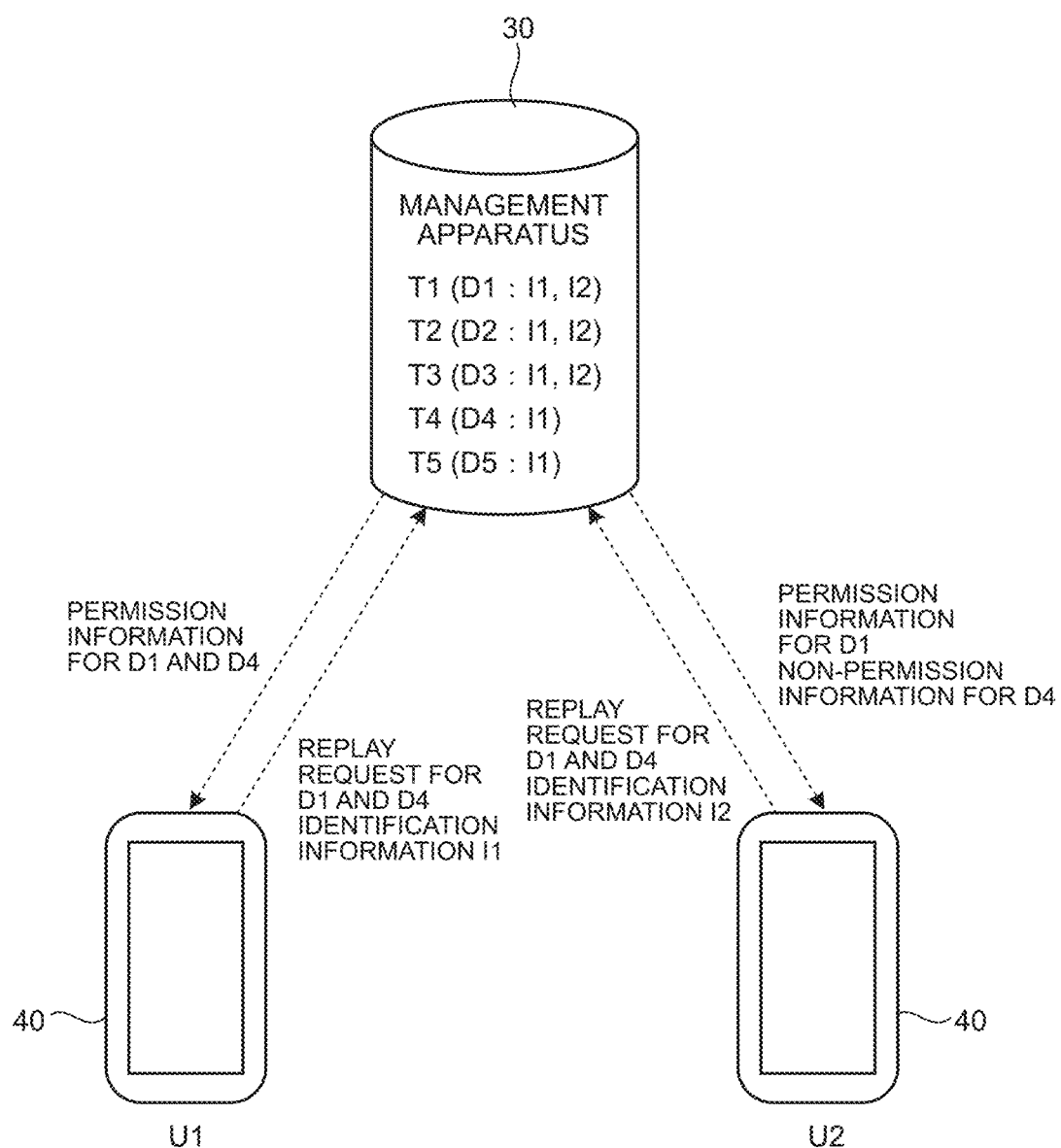
FIG. 6 is a diagram illustrating an example of operation of the video management system.

Operation in a case where sets of video data are replayed will be described next. Predetermined operation is performed at the replay device 40 and a replay request is thereby transmitted to the management apparatus 30. FIG. 6 illustrates, as an example, a case where the users U1 and U2 each transmit a replay request for the sets of video data D1 and D4 to the management apparatus 30 respectively from different replay devices 40.

The communication unit 31 in the management apparatus 30 receives the replay requests. In a case where a replay request has been received by the communication unit 31, the replay processing unit 72 determines whether or not a piece of identification information associated with a set of video data, for which the replay request has been received, is included in the replay request. In a case where the replay processing unit 72 has determined that the piece of identification information associated with the set of video data, for which the replay request has been received, is included in the replay request, the replay processing unit 72 permits replay of the set of video data. In a case where the replay processing unit 72 has determined that the piece of identification information associated with the set of video data, for which the replay request has been received, is not included in the replay request, the replay processing unit 72 does not permit the replay of the set of video data.

In the example illustrated in FIG. 6, the replay request from the user U1 includes the piece of identification information I1. The piece of identification information I1 on the user U1 has been associated with the set of video data D1, for which the replay request has been received. Therefore, the replay processing unit 72 in the management apparatus 30 determines that the piece of identification information I1 on the user U1 has been associated with the sets of video data D1 and D4, for which the replay request has been received from the user U1. In this case, the replay processing unit 72 permits the replay request for the sets of video data D1 and D4 from the user U1. The replay processing unit 72 transmits a request result that is permission information indicating that replay is permitted, to the replay device 40 of the user U1. In a case where the replay device 40 of the user U1 has received the permission information, the replay device 40 downloads and replays the sets of video data D1 and D4 from the management apparatus 30 on the basis of the permission information.

In the example illustrated in FIG. 6, the replay request from the user U2 includes the piece of identification information I2. The set of identification information I2 on the user U2 has been associated with the set of video data D1, for which the replay request has been received. Therefore, the replay processing unit 72 in the management apparatus 30 determines that the piece of identification information I2 on the user U2 has been associated with the set of video data D1, for which the replay request has been received. In this case, the replay processing unit 72 permits the replay request for the set of video data D1 from the user U2. The replay processing unit 72 transmits a request result that is permission information indicating that replay of the set of video data D1 is permitted, to the replay device 40 of the user U2. In a case where the replay device 40 of the user U2 has received the permission information, the replay device 40 downloads and replays the set of video data D1 from the management apparatus 30 on the basis of the permission information.

However, the piece of identification information I2 on the user U2 has not been associated with the set of video data D4. Therefore, the replay processing unit 72 determines that the piece of identification information I2 on the user U2 has not been associated with the set of video data D4, for which the replay request has been received. In this case, the replay processing unit 72 does not permit the replay request for the set of video data D4 from the user U2. The replay processing unit 72 transmits a request result that is non-permission information indicating that replay of the set of video data D4 is not permitted, to the terminal device 10 of the user U2. In a case where the replay device 40 of the user U2 has received the non-permission information, the replay device 40 ends processing without replaying the set of video data D4.

Including the above described functions of the replay device 40 in the terminal device 10 enables the terminal device 10 to be used as the replay device 40.

Figure 7:
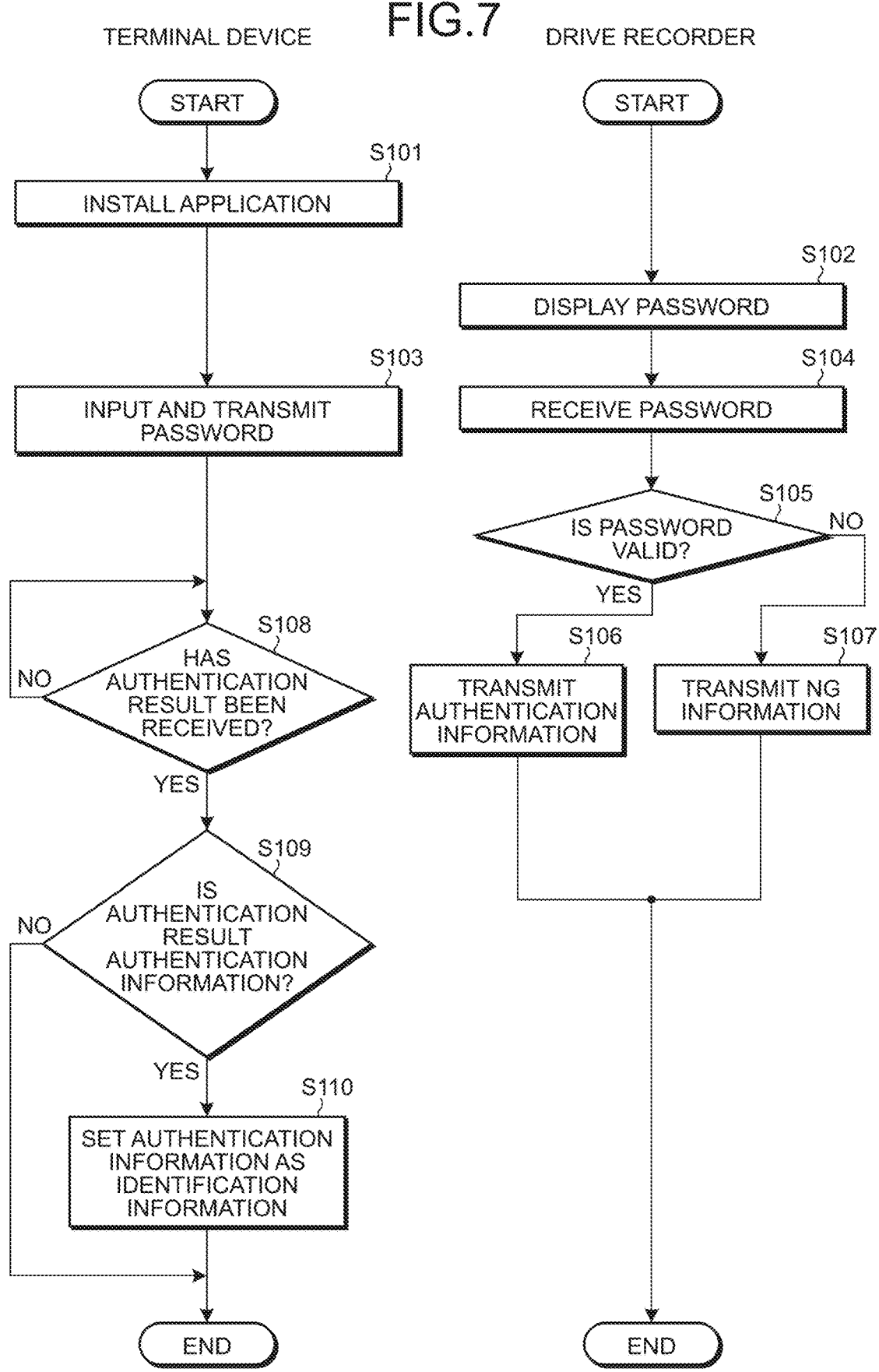
FIG. 7 is a flowchart illustrating an example of operation of the video management system.
Figure 8:
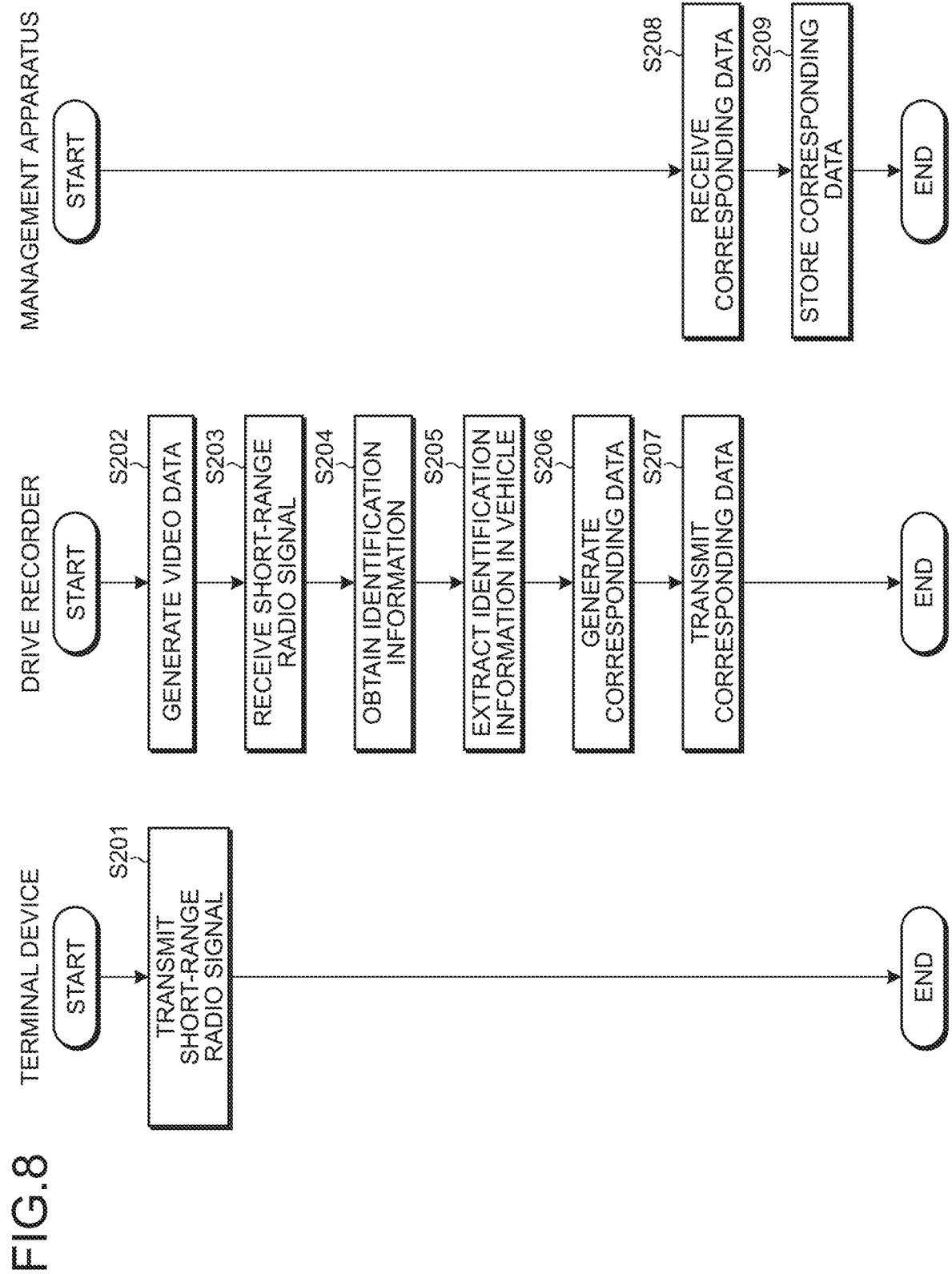
FIG. 8 is a flowchart illustrating an example of operation of the video management system.
Figure 9:
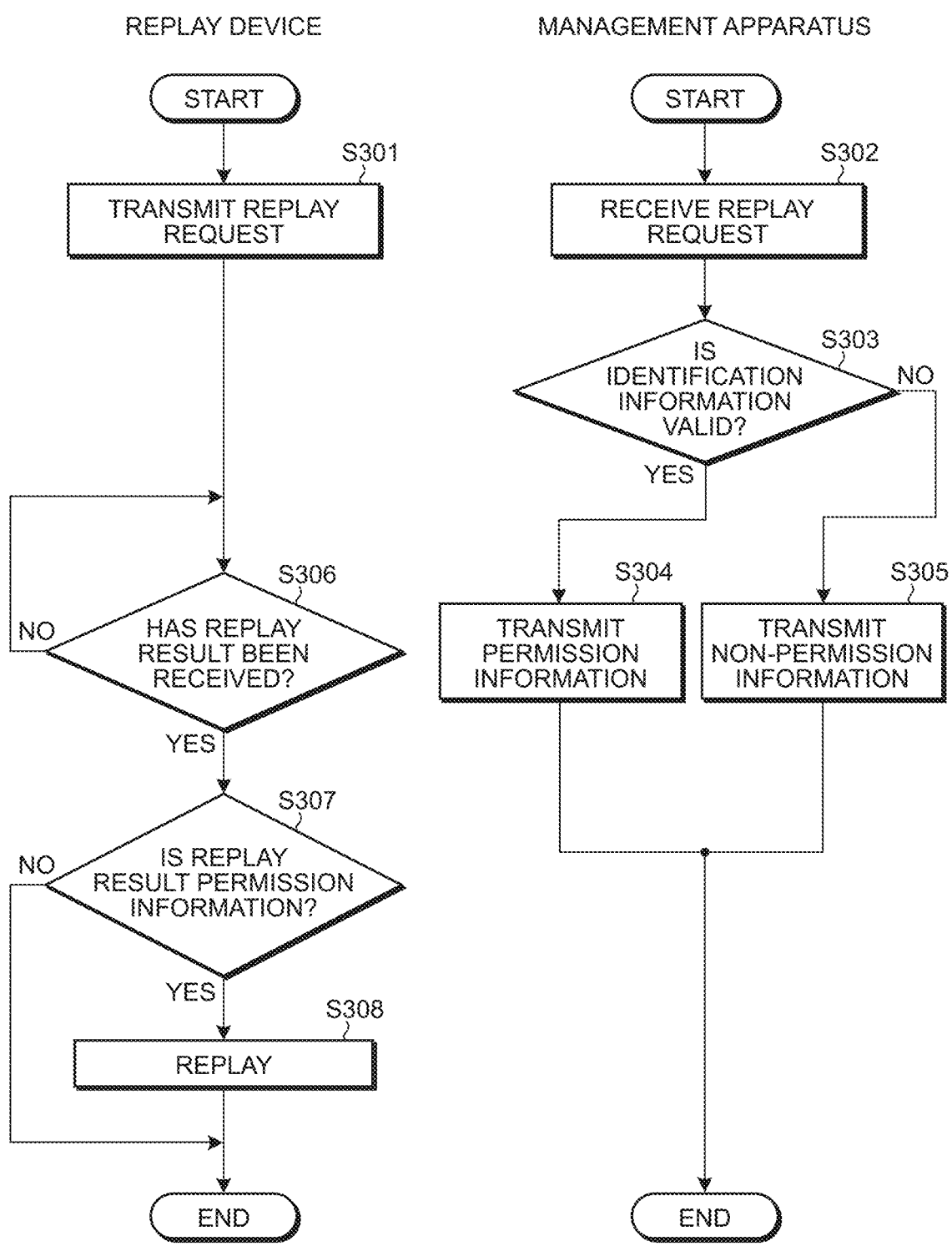
FIG. 9 is a flowchart illustrating an example of operation of the video management system.

FIG. 7 to FIG. 9 are flowcharts each illustrating an example of operation of the video management system 100. FIG. 7 illustrates operation in a case where a piece of authentication information is set between the terminal device 10 and the drive recorder 20. As illustrated in FIG. 7, an application for setting the piece of authentication information between the terminal device 10 and the drive recorder 20 is installed on the terminal device 10 beforehand (Step S101). In a case where predetermined operation is performed on the input unit 22 of the drive recorder 20 by a user in this state, the setting control unit 61 causes a password to be displayed on the display unit 23 (Step S102).

In a case where the password displayed on the display unit 23 of the drive recorder 20 has been input to the input unit 11 in the terminal device 10 and operation for transmitting the password has been performed, the authentication processing unit 51 causes the password to be transmitted from the communication unit 13 (Step S103).

The communication unit 24 in the drive recorder 20 receives the password transmitted (Step S104). The setting control unit 61 determines whether or not the password received is valid (Step S105). In a case where the setting control unit 61 has determined that the password is valid (Yes at Step S105), the setting control unit 61 causes a piece of authentication information to be transmitted to the terminal device 10 as an authentication result (Step S106). On the contrary, in a case where the setting control unit 61 has determined that the password is not valid (No at Step S105), the setting control unit 61 causes an authentication result to be transmitted to the terminal device 10, the authentication result being information indicating that the password is not valid (Step S107).

After the password has been transmitted to the drive recorder 20, the communication control unit 64 in the terminal device 10 determines whether or not any authentication result from the drive recorder 20 has been received (Step S108). In a case where the communication control unit 64 has determined that no authentication result has been received (No at Step S108), the communication control unit 64 repeatedly performs the operation at Step S108.

In a case where the communication control unit 64 determines that an authentication result has been received (Yes at Step S108) and the authentication result received is a piece of authentication information (Yes at Step S109), the communication control unit 64 sets, as a piece of identification information, the piece of authentication information received (Step S110) and ends processing. In a case where the authentication result received is NG information (No at Step S109), the communication control unit 64 skips the processing at Step S110 and ends processing.

FIG. 8 illustrates operation of generating and storing sets of corresponding data. As illustrated in FIG. 8, the communication control unit 52 in the terminal device 10 causes a short-range radio signal to be transmitted per a predetermined time period to the drive recorder 20, the short-range radio signal including a piece of identification information (Step S201).

The image capturing unit 21 in the drive recorder 20 captures videos of the inside and the outside of the vehicle, generates a set of video data per a predetermined time period, and causes the set of video data to be stored in the storage unit 25 (Step S202).

The communication unit 24 receives short-range radio signals transmitted from the terminal devices 10 (Step S203). Any one of the processing at Step S202 and the processing at Step S203 may be started first or the processing at Step S202 and the processing at Step S203 may be started at the same time. The extraction unit 62 obtains pieces of identification information from the short-range radio signals (Step S204) and extracts a piece of identification information from any terminal device 10 that is present in the vehicle, from the obtained pieces of identification information (Step S205). The generation unit 63 generates a set of corresponding data having a set of video data and the piece of identification information associated with each other, the set of video data having been generated by the image capturing unit 21, the piece of identification information having been extracted by the extraction unit 62. The communication control unit 64 transmits the generated set of corresponding data to the management apparatus 30 (Step S207).

The communication unit 31 in the management apparatus 30 receives the set of corresponding data transmitted (Step S208). The storage processing unit 71 causes the received set of corresponding data to be stored in the storage unit 32 (Step S209).

FIG. 9 illustrate operation in a case where a set of video data included in a set of corresponding data is replayed. As illustrated in FIG. 9, by predetermined operation being performed on the replay device 40, a replay request added with a piece of identification information is transmitted to the management apparatus 30 (Step S301).

The communication unit 31 in the management apparatus 30 receives the replay request (Step S302). In a case where the replay request has been received by the communication unit 31, the replay processing unit 72 determines whether or not a piece of identification information associated with the set of video data, for which the replay request has been received, is included in the replay request (Step S303). In a case where the replay processing unit 72 has determined that a piece of identification information associated with the set of video data, for which the replay request has been received, is included in the replay request (Yes at Step S303), the replay processing unit 72 transmits a request result that is permission information indicating that replay of the set of video data is permitted, to the replay device 40 (Step S304). On the contrary, in a case where the replay processing unit 72 has determined that no piece of identification information associated with the set of video data, for which the replay request has been received, is included in the replay request (No at Step S303), the replay processing unit 72 transmits a request result that is non-permission information indicating that replay of the set of video data is not permitted, to the replay device 40 (Step S305).

At the replay device 40, whether a request result transmitted from the management apparatus 30 has been received is determined after transmission of the replay request (Step S306). In a case where it has been determined that no request result has been received from the management apparatus 30 (No at Step S306), the operation at Step S306 is repeatedly performed.

In a case where it is determined that a request result has been received from the management apparatus 30 (Yes at Step S306) and the request result received is permission information (Yes at Step S307), the replay device 40 downloads and replays the set of video data from the management apparatus 30 on the basis of the permission information received (Step S308). In a case where the request result received is non-permission information (No at Step S307), the replay device 40 skips Step S308 and ends processing.

As described above, the video management system 100 according to the embodiment is the video management system 100 configured to include the plural terminal devices 10, the drive recorder 20 mounted in the vehicle R, and the management apparatus 30. The plural terminal devices 10 each include the communication unit that is capable of performing communication with the drive recorder 20 and capable of transmitting a radio signal including a specific piece of identification information. The drive recorder 20 includes the image capturing unit 21 that captures videos of at least one of the inside and the outside of the vehicle R and thereby generates sets of video data, the communication unit 24 that is capable of performing communication with the terminal devices 10 and the management apparatus 30, the extraction unit 62 that extracts a piece of identification information on any terminal device 10 that is in the vehicle R in a case where radio signals including pieces of identification information have been received from the plural terminal devices 10, and the generation unit 63 that generates a set of corresponding data having a generated set of video data associated with the extracted piece of identification information. The management apparatus 30 includes the communication unit 31 that is capable of performing communication with the drive recorder 20 and the terminal devices 10, the storage unit 32 that stores sets of corresponding data generated by the generation unit 63, and the replay processing unit 72 that determines, upon receipt of a replay request including a piece of identification information, whether or not a piece of identification information associated with a set of video data that is a target of the replay request agrees with the piece of identification information included in the replay request, and that permits a transmission source of the replay request to replay the set of video data in a case where the replay processing unit 72 has determined that the pieces of identification information agree with each other.

According to this configuration, a set of corresponding data having a set of video data associated with a piece of identification information on a terminal device 10 of a user on board a vehicle is generated, the set of video data having been captured by the drive recorder 20, and in a case where a replay request is made for the set of video data, replay is permitted in a case where the piece of identification information associated with the set of video data is included in the replay request. Therefore, replay of the set of video data in response to a request by a user not on board the vehicle is able to be prevented from being permitted. Privacy of passengers of the vehicle is thereby able to be protected adequately.

The extraction unit 62 in the video management system 100 according to the embodiment extracts a piece of identification information on any terminal device 10 that is in a vehicle, on the basis of intensities of radio signals received. This configuration enables precise detection of whether or not the terminal devices 10 are present in the vehicle. Therefore, the piece of identification information on the terminal device 10 that is in the vehicle is able to be extracted precisely.

The generation unit 63 in the video management system 100 according to the embodiment generates a set of video data every time a predetermined time period elapses and generates a set of corresponding data for each set of video data generated. According to this configuration, even in a case where the state of the terminal device 10 that is present in the vehicle changes, for example, when the user holding the terminal device 10 gets out of and/or into the vehicle along the way, the set of corresponding data is able to be generated according to the change.

In the video management system 100 according to the embodiment, pieces of identification information are pieces of authentication information individually given to the terminal devices 10 by the drive recorder 20. According to this configuration, a piece of authentication information given by the drive recorder 20 is used as a piece of identification information, and a piece of identification information on any terminal device 10 that is in the vehicle is thus able to be extracted precisely.

The technical scope of the present disclosure is not limited to the embodiment described above and modifications may be made as appropriate without departing from the gist of the present disclosure. For example, the configuration having the management apparatus 30 provided separately from the drive recorder 20 has been described as an example with respect to the embodiment, but the embodiment is not limited to this configuration.

Figure 10:
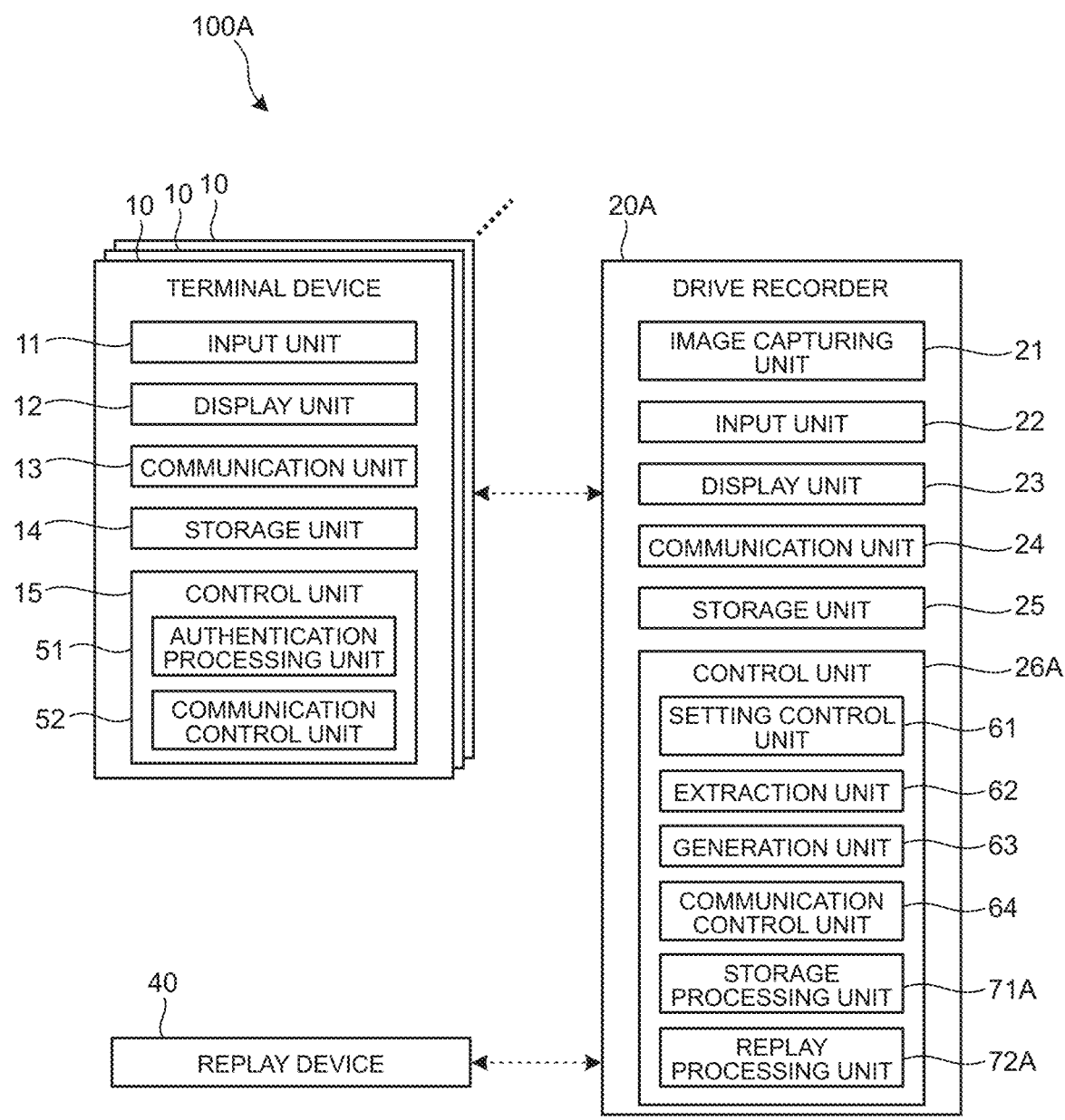
FIG. 10 is a diagram illustrating a configuration of a video management system according to a modified example.

FIG. 10 is a diagram illustrating a configuration of a video management system 100A according to a modified example. As illustrated in FIG. 10, the video management system 100A includes terminal devices 10 and a drive recorder 20A. The drive recorder 20A has the functions of the drive recorder 20 and the functions of the management apparatus 30, these functions having been described above with respect to the embodiment. That is, the video management system 100A is configured to have a configuration provided in the drive recorder 20A, the configuration corresponding to the management apparatus 30. Specifically, a storage processing unit 71 and a replay processing unit 72A that perform processing similar to that of the storage processing unit 71 and the replay processing unit 72 that are provided in the control unit 33 of the management apparatus 30 according to the above described embodiment are provided in a control unit 26A of the drive recorder 20A.

In this configuration, sets of corresponding data generated in the drive recorder 20A are stored in a storage unit 25 of the drive recorder 20A through control by the storage processing unit 71A of the control unit 26A. In a case where a set of video data is to be replayed, a replay device 40 transmits a replay request to the drive recorder 20A. A communication unit 24 in the drive recorder 20A receives the replay request. The replay processing unit 72A determines whether or not a piece of identification information associated with the set of video data, for which the replay request has been received, is included in the replay request. In a case where the replay processing unit 72A has determined that the piece of identification information associated with the set of video data, for which the replay request has been received, is included in the replay request, the replay processing unit 72A permits replay of the set of video data. In a case where the replay processing unit 72A has determined that the piece of identification information associated with the set of video data, for which the replay request has been received, is not included in the replay request, the replay processing unit 72A does not permit replay of the set of video data. In a case where the replay is permitted, the replay processing unit 72A causes permission information to be transmitted as a request result to the replay device 40 and in a case where the replay is not permitted, the replay processing unit 72A causes non-permission information to be transmitted as a request result to the replay device 40.

As described above, the video management system 100A is the video management system 100A configured to include the plural terminal devices 10 and the drive recorder 20A mounted in a vehicle. The plural terminal devices 10 each include a communication unit 13 that is capable of performing communication with the drive recorder 20A and capable of transmitting a radio signal including a specific piece of identification information. The drive recorder 20A includes an image capturing unit 21 that captures videos of at least one of the inside and the outside of the vehicle and thereby generates sets of video data, the communication unit 24 that is capable of performing communication with the terminal devices 10, an extraction unit 62 that extracts a piece of identification information on any terminal device 10 that is in the vehicle in a case where radio signals including pieces of identification information have been received from the plural terminal devices 10, a generation unit 63 that generates a set of corresponding data having a generated set of video data associated with the extracted piece of identification information, the storage unit 25 that stores the set of corresponding data generated by the generation unit 63, and the replay processing unit 72A that determines, upon receipt of a replay request including a piece of identification information, whether or not a piece of identification information associated with a set of video data that is a target of the replay request agrees with the piece of identification information included in the replay request, and that permits a transmission source of the replay request to replay the set of video data in a case where it has been determined that these pieces of identification information agree with each other.

According to this configuration, providing, in the drive recorder 20A, functions of determining whether or not a piece of identification information associated with a set of video data, for which a replay request has been received, is included in the replay request in a case where the replay request for the set of video data of a set of corresponding data has been received, and permitting replay of the set of video data in a case where it has been determined that the piece of identification information is included in the replay request, eliminate the need for separately providing a management apparatus and enables the configuration of the video management system 100A to be downsized.

The present disclosure enables provision of a video management system that enables adequate protection of privacy of passengers in vehicles.

What is claimed is:

1. A video management system configured to include plural terminal devices, a drive recorder to be mounted in a vehicle, and a management apparatus, wherein
the plural terminal devices each include a terminal communication unit that is capable of performing communication with the drive recorder and transmitting a radio signal including a specific piece of identification information,
the drive recorder comprises:
an image capturing unit that generates a set of video data by capturing a video of at least one of inside and outside of the vehicle;
a recorder communication unit that is capable of performing communication with the terminal devices and the management apparatus;
an extraction unit that extracts a piece of identification information on any terminal device that is in the vehicle in a case where the radio signals including the pieces of identification information have been received from the plural terminal devices; and
a generation unit that generates a set of corresponding data having the extracted piece of identification information associated with the set of video data generated, and
the management apparatus comprises:
a management communication unit that is capable of performing communication with the drive recorder and the terminal devices;
a storage unit that stores the set of corresponding data generated by the generation unit; and
a replay processing unit that determines, upon receipt of a replay request including the piece of identification information, whether or not the piece of identification information associated with the set of video data that is a target of the replay request agrees with the piece of identification information included in the replay request, and that permits a transmission source of the replay request to replay the set of video data in a case where it has been determined that these pieces of identification information agree with each other.

2. The video management system according to claim 1, wherein the extraction unit extracts the piece of identification information on the terminal device that is in the vehicle, on the basis of intensities of the radio signals received.

3. The video management system according to claim 1, wherein the generation unit performs generation of the set of video data every time a predetermined time period elapses and performs generation of the set of corresponding data for each of the sets of video data generated.

4. The video management system according to claim 1, wherein the pieces of identification information are pieces of authentication information individually given to the terminal devices by the drive recorder.

5. A video management system configured to include plural terminal devices and a drive recorder that is to be mounted in a vehicle, wherein
the plural terminal devices each include a terminal communication unit that is capable of performing communication with the drive recorder and capable of transmitting a radio signal including a specific piece of identification information, and
the drive recorder comprises:
an image capturing unit that generates a set of video data by capturing a video of at least one of inside and outside of the vehicle;
a recorder communication unit that is capable of performing communication with the terminal devices;
an extraction unit that extracts a piece identification information of any terminal device that is in the vehicle in a case where the radio signals including the pieces of identification information have been received from the plural terminal devices;
a generation unit that generates a set of corresponding data having the extracted piece of identification information associated with the set of video data generated;
a storage unit that stores the set of corresponding data generated by the generation unit; and
a replay processing unit that determines, upon receipt of a replay request including the piece of identification information, whether or not the piece of identification information associated with the set of video data that is a target of the replay request agrees with the piece of identification information included in the replay request, and permits a transmission source of the replay request to replay the set of video data in a case where it has been determined that these pieces of identification information agree with each other.

6. The video management system according to claim 5, wherein the extraction unit extracts the piece of identification information on the terminal device that is in the vehicle, on the basis of intensities of the radio signals received.

7. The video management system according to claim 5, wherein the generation unit performs generation of the set of video data every time a predetermined time period elapses and performs generation of the set of corresponding data for each of the sets of video data generated.

8. The video management system according to claim 5, wherein the pieces of identification information are pieces of authentication information individually given to the terminal devices by the drive recorder.

* * * * *